United States Patent [19]

Lowerre

[11] 4,102,497
[45] Jul. 25, 1978

[54] RAIL BOND

[75] Inventor: Ralph T. Lowerre, Coral Springs, Fla.

[73] Assignee: Hanlon & Wilson Company, Jeannette, Pa.

[21] Appl. No.: 711,430

[22] Filed: Aug. 4, 1976

[51] Int. Cl.² .............................................. B60M 5/00
[52] U.S. Cl. ................................ 238/14.8; 238/14.1; 339/276 RB
[58] Field of Search .......................... 238/14.05–14.15; 403/202, 203, 238, 239; 29/525; 339/276 R, 276 RB

[56] References Cited

U.S. PATENT DOCUMENTS

| Re. 12,359 | 6/1905 | Richardson | 403/238 |
| 557,037 | 3/1896 | Toquet | 339/276 R |
| 650,860 | 6/1900 | McTighe | 339/276 R |
| 697,890 | 4/1902 | Rowell | 238/14.1 |
| 2,179,609 | 11/1939 | Bidwell | 339/276 R |
| 2,795,442 | 6/1957 | Wilson | 238/14.8 |

FOREIGN PATENT DOCUMENTS 685,021   4/1964   Canada .................. 450/238

Primary Examiner—Drayton E. Hoffman
Assistant Examiner—Carl Rowold
Attorney, Agent, or Firm—Webb, Burden, Robinson & Webb

[57] ABSTRACT

Rail bonds providing electrical connections between adjoining and parallel rail lengths, between rail and external circuits, between rail and frogs, switches and the like include a rail bond terminal comprising a stranded conductor, an inner sleeve having a flared portion and secured to an end of the conductor, and a tapered outer sleeve having open ends into which the inner sleeve and conductor can be inserted. One end of the outer sleeve forms a head portion having an opening sufficient to receive the conductor to permit the conductor to be removed from the area of the end of the terminal to which a hammer is applied for driving the terminal into a rail or the like.

9 Claims, 5 Drawing Figures

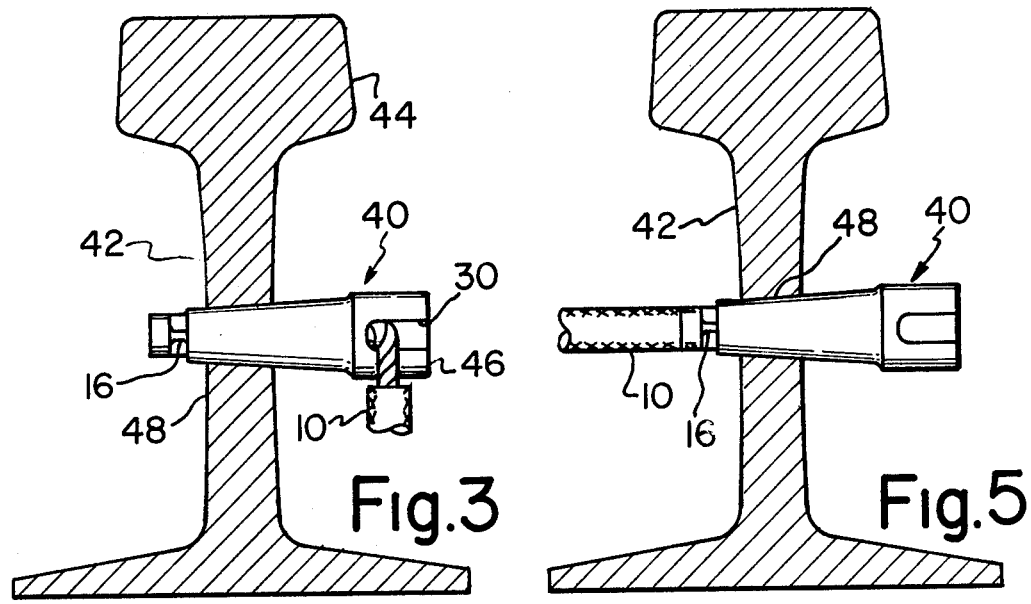
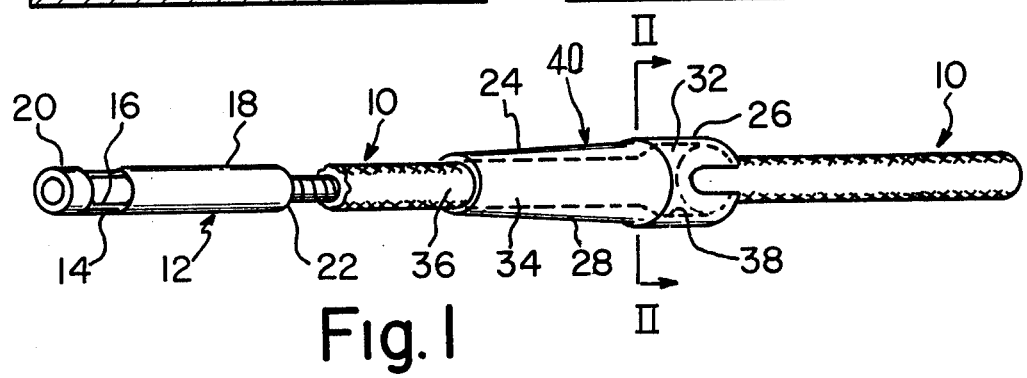
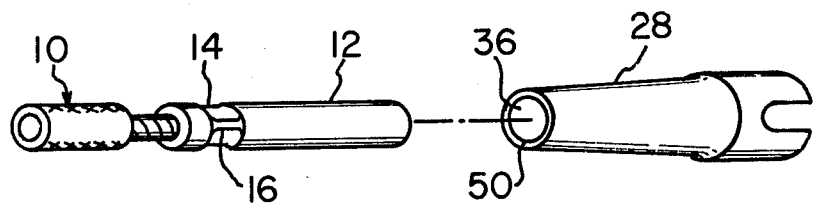
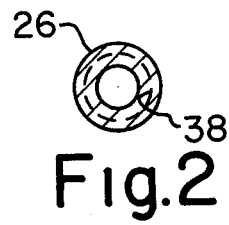

RAIL BOND

This invention relates to rail bonds and particularly to improved terminals for rail bonds providing electrical connections to rail lengths, between rail and external circuits, between rail and frogs, switches and the like. The terminals are particularly useful in applications where it is possible to lead the conductor to either side of a rail or the like while securing the terminal to the same from only one side. Stated otherwise, the terminal is always secured to a rail from one side, although the conductor may be led to the terminal from either end thereof.

Present rail bonds and methods of attaching them to rails, switches, frogs and the like are not entirely satisfactory principally because very flexible conductors which will resist vibration fatigue, such as fine stranded wires, are required. Various devices and techniques have been developed to secure such very flexible conductors to a rail or the like.

One known device utilizes a solid tapered terminal driven into a hole drilled through a rail web (See e.g. U.S. Pat. No. 1,843,501). It is limited to application from only one side.

A second known device employs a cup and tapered pin which provides for entry from either side (See, e.g. U.S. Pat. No. 3,058,764). However, use of this device depends upon the skill of the person driving the tapered pin. If the pin is driven too deeply it will damage the stranded conductor; if the pin is not driven deeply enough electrical conduction may be affected adversely.

Other types of devices provide exothermically welded and explosively bonded connections between rail bond terminals and rails or the like. These are limited to application from only one side of a rail.

Other pertinent United States Patents having terminals which are driven into rails or the like are Wilson U.S. Pat. No. 2,795,442 (assigned to the assignee of the present application) and Bovard U.S. Pat. No. 2,582,937. However, neither of these patents provides for double entry of the conductor into the terminal. In my invention, I have combined features of these two known and accepted means of making a permanent connection between a copper sleeve and a very flexible strand and a permanent connection between a sleeve/strand connection and a rail. The former connection involves securing a sleeve onto the end of a flexible, stranded conductor by swaging, crimping, and the like. The latter connection involves inserting the sleeved conductor end into an outer tapered sleeve and driving the outer sleeve into a hole in a rail.

In summary, I have invented a rail bond terminal comprising a flexible stranded conductor and an inner sleeve secured to the conductor adjacent one end thereof. The outer surface of the inner sleeve is substantially cylindrical and includes a flared portion thereon adjacent one of its ends. The inner sleeve and the end of the conductor are adapted for insertion into an outer sleeve including a head portion and a shank portion. A cylindrical bore extends through the shank portion and communicates with a cylindrical bore of larger diameter in the head portion. Thus, the outer sleeve is open at both ends and the conductor can be received in either of the ends. The flared portion is formed on the outer surface of the inner sleeve adjacent the end opposite from the head portion of the outer sleeve upon insertion. There is also an opening, preferably in the form of a slot, in the head portion of the outer sleeve of a size sufficient to admit the conductor.

In a preferred embodiment, the flared portion includes at least one fin which extends substantially longitudinally of the terminal. The fin extends from the outer surface of the inner sleeve and is preferably formed by mechanically crimping the inner sleeve to secure it on to the end of the conductor in a manner well known in the art. More than one fin may be formed. The inner sleeve is preferably made of copper to facilitate electrical conduction and is also easily deformable.

The features of the invention will be understood from the following detailed description when taken with the accompanying drawings in which:

FIG. 1 is a perspective view of the elements of my improved rail bond terminal prior to assembly in a first embodiment of the invention;

FIG. 2 is a cross-sectional view taken along lines II—II of FIG. 1 showing the inside of the outer sleeve;

FIG. 3 is a cross-sectional view through a length of rail showing the installed rail bond terminal in accordance with the first embodiment of the invention;

FIG. 4 is a perspective view of the elements of my improved rail bond terminal prior to assembly in a second embodiment of the invention; and FIG. 5 is a cross-sectional view through a length of rail showing the installed rail bond terminal in accordance with the second embodiment of the invention.

Referring to FIGS. 1 and 2, a flexible stranded conductor 10 is pulled through terminal 40 and is inserted into an inner sleeve 12, preferably made of copper material. The sleeve 12 is permanently secured to the conductor 10 by mechanically crimping the sleeve in a conventional manner forming a flared portion 14 on one end of the sleeve and an elongated barrel portion on the other end of the sleeve. The flared portion is defined by at least one fin 16 which extends longitudinally of the sleeve and radially from outer surface 18 of the sleeve. The flared portion is formed adjacent end 20 of the sleeve opposite to end 22 which is first inserted into outer sleeve 24 which forms a further element of the terminal.

Outer sleeve 24 comprises a head portion 26 and a shank portion 28. The head portion includes an opening, such as slot 30, of a size sufficient to receive the conductor 10 when it is extended therethrough. The outer surface 32 of the head portion is substantially cylindrical and the outer surface 34 of the shank portion is tapered. A bore 36 extends through the shank portion and communicates with a larger counterbore 38 in the head portion so that the outer sleeve is open at both ends. The diameter of bore 36 is slightly larger than the diameter of the inner sleeve 12, but slightly less than the extent of the flared portion so that when the inner sleeve and conductor are inserted by hand into the bore 36, the flared portion frictionally engages the wall of the bore and the barrel portion of the sleeve is located within the bore. The frictional engagement of the flared portion in the bore automatically positions the inner sleeve and conductor in the bore when it is inserted into the outer sleeve.

FIG. 3 shows the terminal 40 of FIGS. 1 and 2 installed in a web 42 of a length of railroad rail 44. To install the terminal, initially the inner sleeve 12 carrying the end of conductor 10 is positioned in the outer sleeve as previously described. Thereafter, since the conductor 10 extends from the terminal on the same side of the web 42 from which the terminal is to be driven into the web, the conductor is bent at substantially right angles to the length of the terminal 40 and extends through the slot 30 so that end 46 of the outer sleeve is free of obstruction. The terminal 40 is then installed in the rail web 42 by hammer blows applied to the end 46 of the head portion, driving the tapered shank portion of the terminal into predrilled hole 48 in the web of the rail.

FIG. 4 shows the same elements of the terminal shown in FIGS. 1 and 2 except that the conductor 10 is inserted into the opposite end of the inner sleeve 12. In this embodiment, the inner sleeve and conductor are adapted to be inserted into the outer sleeve from end 50 of the outer sleeve and into the shank portion 28. Since the flared portion 14 of the inner sleeve is adjacent the end of the inner sleeve 12 opposite the end of the elongated barrel which is first inserted into end 50 of the outer sleeve, the frictional engagement between the fins 16 of the flared portion and the bore 36 of the shank portion will automatically position the inner sleeve in the outer sleeve for installation.

The terminal 40 is installed in web 42 in the same manner as previously described. However, in the embodiment shown in FIG. 5, in order to install the terminal when the conductor 10 is on the side of the rail web opposite the side on which the head portion is exposed for hammer blows, it is first necessary to insert the inner sleeve and the conductor end secured thereto through the predrilled hole 48 in the rail web before inserting it into the outer sleeve. After this step is taken, the frictional engagement between the inner sleeve 12 and the bore 36 will hold the conductor in the outer sleeve 24 to enable the terminal to be installed in the rail by hammer blows applied to the end of the head portion, as previously described, to drive the tapered shank portion into the hole in the web of the rail.

In both embodiments, therefore, as the terminal 40 is driven into the hole 48 in the web of the rail by means of hammer blows on the head portion, a permanent connection is established between the inner and outer sleeves and the outer sleeve and the web of the rail due to the wedging action of the tapered shank portion in the hole in the web.

The invention provides a facile, inexpensive installation of rail bond terminals from one side of a rail or the like and permits the conductor forming a part of the terminal to be located on either side thereof.

Having described preferred embodiments of my invention, it may be otherwise embodied within the scope of the appended claims.

I claim:

1. A rail bond terminal comprising:
   A. a flexible stranded conductor;
   B. an inner sleeve secured to said conductor adjacent one end thereof, the outer surface of said inner sleeve being substantially cylindrical and having an elongated barrel portion and a radially extending flared portion formed thereon adjacent one end;
   C. an outer sleeve including a head portion and a shank portion having a tapered outer surface, a cylindrical bore extending through said shank portion and through said head portion such that the outer sleeve is open at both ends, the diameter of the bore being slightly less than the radial extent of said flared portion such that when the inner sleeve and conductor are inserted into the bore, the flared portion frictionally engages the wall of the bore;
   D. the end of the elongated barrel portion of said inner sleeve opposite the end adjacent to said flared portion being inserted into said cylindrical bore in said shank portion of said outer sleeve at the smaller end of said shank portion; and
   E. a radial opening formed in said head portion of a size sufficient to receive said conductor.

2. A rail bond terminal as set forth in claim 1 in which said flared portion on the outer surface of said inner sleeve comprises at least one fin extending substantially longitudinally of said inner sleeve.

3. A rail bond terminal as set forth in claim 2 in which the flared portion on the outer surface of said inner sleeve is formed by crimping said inner sleeve to secure it to said conductor.

4. A rail bond terminal as set forth in claim 1 in which said inner sleeve is copper.

5. A rail bond as set forth in claim 1 wherein the portion of said cylindrical bore extending through said head portion has a diameter greater than the diameter of the portion of said cylindrical bore extending through said shank portion.

6. A rail bond terminal comprising:
   A. a flexible stranded conductor;
   B. an inner sleeve secured to one end of said conductor, the outer surface of said inner sleeve being substantially cylindrical and having an elongated barrel portion and a flared portion extending radially from said outer surface;
   C. an outer sleeve including a head portion at one end and a shank portion terminating in the opposite end, the outer surface of said head portion being substantially cylindrical and the outer surface of said shank portion being smoothly tapered from a larger diameter adjacent said head portion to a smaller diameter at said opposite end, a cylindrical bore extending through said shank portion and having a diameter slightly greater than the diameter of said inner sleeve, the diameter of the bore being slightly less than the radial extent of said flared portion such that when the inner sleeve and conductor are inserted into the bore, the flared portion frictionally engages the wall of the bore, said cylindrical bore communicating with a cylindrical bore in said head portion to provide a bore completely through said outer sleeve;
   D. the elongated barrel portion of said inner sleeve being inserted into said bore in said shank portion of said outer sleeve; and
   E. a radial opening formed in the outer surface of said head portion of said outer sleeve of a size sufficient to receive said flexible conductor when said inner sleeve is inserted in said cylindrical bore, said conductor being bent at right angles with respect to the longitudinal axis of said bore when received in said radial opening to thereby provide the end of said head portion suitable for striking with a hammer to force the terminal into a hole in a rail or the like.

7. A rail bond terminal as set forth in claim 6 wherein both ends of said inner sleeve are open to provide a passageway completely through said inner sleeve whereby said conductor may be inserted into either end of said inner sleeve and said flared portion being located adjacent an end of said inner sleeve.

8. A rail bond terminal as set forth in claim 6 wherein said flared portion on the outer surface of said inner sleeve includes at least one fin.

9. A terminal for attaching an electrical conductor to a rail, said terminal comprising:

A. an inner sleeve adapted to be secured to a conductor adjacent one end of the conductor, the outer surface of said inner sleeve being substantially cylindrical and having an elongated barrel portion and a radially extending flared portion thereon adjacent one end;

B. an outer sleeve including a head portion and a shank portion having a tapered outer surface adapted to fit into a hole formed in a rail, a cylindrical bore extending through said shank portion and a cylindrical bore extending through said head portion and communicating with said cylindrical bore extending through said shank portion such that the outer sleeve is open at both ends, and a radial opening in said head portion adapted to receive a conductor; and C. the elongated barrel portion of said inner sleeve opposite the end adjacent to said flared portion being inserted into said cylindrical bore in said shank portion of said outer sleeve at the smaller end of said shank portion and the diameter of the bore in the shank portion being less than the radial extent of the flared portion such that the flared portion frictionally engages the wall of the bore whereby a conductor secured to said inner sleeve when said inner sleeve is inserted into said outer sleeve will be in electrical contact with a rail when the tapered shank of the outer sleeve is inserted into a hole in the rail.

* * * * *